US 6,671,772 B1

(12) United States Patent
Cousins (10) Patent No.: US 6,671,772 B1
(45) Date of Patent: Dec. 30, 2003

(54) HIERARCHICAL FILE SYSTEM STRUCTURE FOR ENHANCING DISK TRANSFER EFFICIENCY

(76) Inventor: Robert E. Cousins, 14330 Cordwood Ct., Saratoga, CA (US) 95070

( * ) Notice: Subject to any disclaimer, the term of this patent is extended or adjusted under 35 U.S.C. 154(b) by 431 days.

(21) Appl. No.: 09/665,965

(22) Filed: Sep. 20, 2000

(51) Int. Cl.[7] .............................................. G06F 17/30
(52) U.S. Cl. ........................ 711/112; 711/4; 711/111; 711/113; 711/114; 707/100; 707/102; 707/103 R
(58) Field of Search ................................. 707/100–103; 717/108; 711/4, 111–114, 202

(56) References Cited

U.S. PATENT DOCUMENTS

| 5,630,104 A | * | 5/1997 | Ottesen et al. ................. 703/24 |
| 5,974,424 A | * | 10/1999 | Schmuck et al. ........... 707/201 |
| 6,119,118 A | * | 9/2000 | Kain et al. .................... 707/10 |
| 6,230,312 B1 | * | 5/2001 | Hunt ........................... 717/108 |

OTHER PUBLICATIONS

Helen Custer, "Winside the Windows NT File System", 1994, Microsoft Press, pp. 24–27.*

* cited by examiner

*Primary Examiner*—Than Nguyen
(74) *Attorney, Agent, or Firm*—David Alberti; Gray Cary Ware & Freidenrich LLP (57) ABSTRACT

In accordance with the invention, a system and method for further enhancing the transfer efficiency of the disk is provided. In an aspect of the invention, a hierarchical data structure for storing a portion of data in a data file is provided. The data structure includes a granule storage unit that is configured to store individual bits of data, a randomly sized component data unit that is configured to group a sequence of granules as a related data unit, and an extent transfer unit that is configured to group at least one component data unit as a data file. The granule storage unit may include at least one header granule and at least one data granule. The header granule includes metadata information relating to the component data unit.

27 Claims, 3 Drawing Sheets

HIERARCHICAL FILE SYSTEM STRUCTURE FOR ENHANCING DISK TRANSFER EFFICIENCY

The present invention relates generally to computer file systems and their organization and more particularly to file systems for disk data storage.

BACKGROUND OF THE INVENTION

A file system is a hierarchical structure (file tree) of files and directories. File systems are utilized in order to maintain, manage and organize the large amounts of data ordinarily stored in a computer system, either on a physical disk drive, a volatile or non-volatile memory, or any other such storage medium. Depending on the selected storage medium, file system maintenance, management and organization can become very important in the efficient transfer of data.

For example, in disk drive systems, conventional file systems typically store information as blocks of data which are units of storage allocation. A block of data typically has a size corresponding to some integer power of two storage sectors. Thus, conventional file systems which employ a block file structure, vary in the amount of data that can be stored in a single block. For example, the UNIX System V file system and most MS-DOS floppy disk file systems are capable of storing blocks of data in block sizes of $2^9$ sectors, or 512 bytes. File systems such as the SVR3 (an extension of the Unix System V file system) and CP/M (Control Program for Microprocessors, developed by Digital Research Corporation) were capable of storing blocks of data in $2^{10}$ sectors, or 1,024 bytes. Similarly, the MS-DOS floppy disk file system can also store blocks of data in this block size. SVR3 also provides an alternate option for storing data in block sizes of $2^{11}$ sectors, or 2,048 bytes. Moreover, some BSD (Berkeley Software Distribution, a version of the Unix operating system developed at and distributed at the University of California at Berkeley) systems and some MS-DOS hard disk file systems provide for data storage in block sizes of $2^{12}$ sectors, or 4,096 bytes, while most modern UNIX file systems utilize block storage sizes of $2^{13}$ sectors, or 8,192 bytes. Some MS-DOS systems are capable of incorporating even larger block sizes.

Unfortunately, due to the physical constraints of the disk drive (i.e., track length, density, etc.) inefficiencies in data transfer generally result once a significant amount-of data is located on the disk drive. The size of a data block has a number of implications on transfer and storage efficiency of a disk drive. Specifically, a large data block suggests that more disk space will be wasted since multiple files are not normally written to a block, even if space is available. For example, a small 100 byte data file will consume one entire data block, regardless of whether the block size is 512 bytes or 32 K bytes. Although only a portion of the data block includes the 100 byte file, the remaining space in the data block is unusable and therefore wasted.

In addition, a large data block suggests that more bits are transferred to and from the disk during a single read/write operation. Generally, the time required to perform a read or a write operation involves several parameters: (1) the service time for an operation in the disk queue to be performed, (2) the disk latency time, and (3) the data transfer time for the required data to be transferred (typically, doubling the transfer unit size doubles the data transfer time).

In conventional multi-tasking systems it is common for the disk drive to be busy while the computer is performing an operation other than a read or a write operation. Generally, a disk drive can be expected to perform one operation per every few disk rotations. Thus, given a large operation demand, the waiting time for an operation in the disk queue to be performed can be predicted as the product of the service time and the queue length. As such, delays of 100 milliseconds are not uncommon on conventional systems during operation demand peaks. These delays can become significant and can increase the time for a disk drive to perform an operation, such as a read or a write operation.

In addition, due to the mechanical nature of a disk drive, disk latency delays are typically associated with the time for the disk drive read/write head to be positioned to the proper cylinder of the disk and the time for the desired data on that cylinder to rotate under the disk drive read/write head. Conventional disk drives also typically have latency delays for selecting a particular track of the disk within the cylinder. For example, most disk drives have a rotation time of about 16.7 milliseconds (3,600 RPM) and seek at speeds greater than 13 milliseconds. Some current disk drives often rotate at 11, 8.3 or 5.5 milliseconds (5,400, 7,200, or 10,800 RPM, respectively) and seek at about the same speed. That is, disk drives can be viewed as rotating faster than they seek. Long seek delays (latency) can thus affect the transfer efficiency of the disk. It becomes extremely difficult to achieve an average of approximately one disk operation per rotation. Thus, minimizing seek delays, such as by optimally placing data on the disk to reduce seek distance and to sort outstanding disk drive read/write requests in the queue to minimize the seek time between requests, becomes important.

The complexity of metadata (the information on the disk about the files stored on it) for tracking the information about the data on the disk is also affected by the size of the data block. A file system contains information that is required to allow data to be accessed. This information takes the form of both user-visible and user-invisible data structures, such as the various directories which provide a mapping between file names and file numbers. There are also additional characteristics to maintain, such as disk drive free space, which data blocks are within which files, and the order of the data blocks within the files, along with any data gaps within the files. Most file systems also track information concerning creation, access and/or modification times for each file along with security and permission information of some type.

Large data blocks also suggest that fewer data blocks are available for a given amount of storage and fewer data blocks available per file on average. This allows the metadata structures of the files to be smaller and less sophisticated. The MS-DOS FAT (file allocation table) is a classic example of a simple metadata structure that does not scale well to a large storage architectures. While it supports up to 64 K blocks per file system, a 2 gigabyte file system utilizes blocks of 32 K each. This characteristic results in a large amount of wasted disk space and a degradation in transfer efficiency of the disk.

Physical disk geometry is also affected by the data block size. Traditional disk drives have a known number of sectors per track, a known number of heads per cylinder and a known number of cylinders per device. While these parameters may vary from device to device, these three values are generally sufficient for the system software to select the placement of on-disk data structures so that disk latency is minimized.

For example, many file systems, such as UFS (Unix File System), take this disk geometry into account at a very basic level. UFS is designed around the concept of a "cylinder group" which is simply a collection of adjacent cylinders on the disk drive. This cylinder group contains its own allocation metadata and is managed by the system as autonomously as possible. That is, files tend to be allocated within the same cylinder group as their parent directory in an attempt to minimize disk latency.

Unfortunately, disk seeking typically involves a non-linear seek process. Disk head movement is generally described by the equation delay=(number of tracks to be moved)*(per track delay)+(settling time). To help reduce disk latency, microcontrollers are often utilized to accelerate disk head movement during the beginning of a seek and decelerate disk head movement toward the end of the seek. This provides dramatically faster performance for longer seeks and renders the above equation incomplete.

Two common methods to rate the seek time of a disk involve measuring either: (1) the average of all seek times from all cylinders to all other cylinders; or (2) the time to seek ⅓ of the distance across the disk. Both of these ratings are heavily influenced by long seek delays. Therefore, a technique that has the effect of reducing the maximum seek times by at least 10% would be extremely valuable.

To help address minimizing seek times of the disk, over the past few years, disk densities have been improved by placing more sectors on tracks at the outside of a disk than at the inside of the disk. This technique is referred to as "multi-zoning" and is common in modern SCSI (Small Computer System Interface) and IDE (Integrated Drive Electronics) disk drives. Even CD-ROMS utilize a similar technique, referred to as "constant radial velocity" that uses a spiral pattern for storing data instead of the track and sector architecture generally utilized by hard disks. Unfortunately, the spiral pattern makes random access of the CD-ROM difficult. Moreover, multi-zoning does not address the long seek times of the disk in reading/writing data at the inside of the disk. As such, multi-zoning does not adequately address disk latency and transfer efficiency.

Finally, on disk data compression is another aspect of a disk that is affected by the file block size. Relatively few file systems have attempted to use compression techniques to increase the effective storage of a disk. The introduction of compression into the file system adds complexity, increased memory demands on the system, and CPU burden which can be prohibitive to computational resources. Furthermore, most compression algorithms used for disk storage are adaptive which results in improved compression ratios for larger units of data. For example, LZW (e.g., GIF compression) and LZ77 (a dictionary-based compression method) style algorithms can actually expand small blocks of data storage. Furthermore, once the data is compressed, the resulting bits are no longer the same size as the disk sectors and it is difficult to predict how many disk sectors will be required to store a given uncompressed data block once it is compressed.

Thus, an optimal data transfer scheme is needed to help enhance the transfer efficiency of a disk. In addition to enhancing data transfer efficiency of the disk, a system for providing enhanced data recovery across a disk array is needed. Furthermore, enhancing the storage density and increasing the bandwidth efficiency of the disk is also needed. It is to these ends that the present invention is directed.

SUMMARY OF THE INVENTION

In accordance with the invention, a system and method for further enhancing the transfer efficiency of the disk is provided. In an aspect of the invention, a hierarchical file structure for storing a portion of data in a data file is provided. The file structure includes a granule storage unit that is configured to store individual bits of data, a variable sized component data unit that is configured to group a sequence of granules as a related data unit, and an extent transfer unit that is configured to group at least one component data unit as a data file. The granule storage unit may include at least one header granule and at least one data granule. The header granule includes metadata information relating to the component data unit.

In another aspect of the invention, the granule storage unit may include a second header granule. The second header granule includes supplemental metadata information relating to the component data unit.

Additionally, in accordance with the invention, in another aspect of the invention, a system for maintaining metadata information about data stored on a disk is provided. The system includes a plurality of data files stored on the disk, each data file including a hierarchical data structure for storing a portion of data, such as that described above. In addition, a like plurality of meta-component data units are provided, a respective meta-component data unit allocated for each data file. Each meta-component data unit includes a first data structure for maintaining operating system file information and a second data structure for maintaining a component data table.

In yet another aspect of the invention, a method for organizing hierarchical data structures on a disk by a file system is provided. The method comprises the steps of designating each extent transfer unit within the file system with an extent number so that a particular extent can be located by the file system, designating each component data unit within the extent with a file number identifying the location of the component within the extent so that a particular component can be located by the file system, allocating a disk address to each component within the extent so that the data in the extent can be accessed in a proper order, storing each component within the extent at the allocated disk address, and periodically relocating each component within the extent to a different location of the disk so that efficiency of the disk is maintained.

Accordingly, in an aspect of the invention, frequently accessed components are relocated toward the inner portion of the disk. Furthermore, components are stored on the disk in an uncompressed format and are compressed in accordance with a specific compression ratio as they become dormant.

Advantageously, in an aspect of the invention, the compression ratio of the component can be improved by iteratively processing the component with different compression algorithms and comparing each compression ratio result with a currently applied compression ratio to determine whether the compression ratio result is superior to the currently applied compression ratio. If the compression ratio result is superior to the currently applied compression ratio, the data in the component is processed by the compression algorithm associated with the superior comperssion ratio. Furthermore, this compression processing may occur during CPU idle time when additional CPU processing cycles are free to procession the different compression algorithms.

In yet another aspect of the invention, a system for organizing data files across a redundant array of independent disks is provided. The system includes an array of independent disks configured to store a plurality of data files thereon. A plurality of data files are stored on the disk array, each data file including a hierarchical data structure for storing a portion of data, as described above. A like plurality of meta-component data units are also stored on the disk array, a respective meta-component data unit allocated for each data file as described above. The plurality of data files may be stored on the disk array such that at least a portion of some of the data files are stored on multiple disks in the array.

In an aspect of the invention, a parity region is provided in the extent transfer unit for maintaining parity information about the data file so that the data file can be maintained across the entire disk array such that complete data recovery can be accomplished in the event of a failure of one of the disks in the array in accordance with the parity information.

Moreover, for providing improved disk efficiency and data management of data files across an ultra-wide redundant array of independent disks, a second plurality of meta-component data units may be stored on the disk array, a respective second meta-component data unit allocated for each data file. The second meta-component data units may maintain secondary parity information about each of the associated data files, such as by including an orthogonal parity scheme such that a lost data file can be recovered in the event of a secondary failure of another disk in the array.

Finally, in still another aspect of the invention, a method for enhancing the data transfer efficiency of a disk is provided. The method comprises the steps of assigning a predetermined fraction of a data track of the disk as a data transfer unit. Thus, in response to a disk operation to read or write data from an indicated data track of the disk, moving a data transfer read/write head of the disk to the indicated data track and carrying out the disk operation accordingly, such that the disk operation is completed after a fraction of a single rotation of the disk substantially equal to the data transfer unit. Accordingly, a next disk operation to be performed at a next indicated data track of the disk is determined and within the remaining fraction of the single rotation of the disk, the data transfer read/write head is moved to the next indicated data track of the disk. The next disk operation to read or write data from the next indicated data track is thus carried out such that at least one disk operation is performed per a single rotation of the disk.

DETAILED DESCRIPTION OF THE PREFERRED EMBODIMENT

In order to understand the present invention, a conventional data organization technique will first be described. Conventional file systems utilize an "elevator" algorithm for disk seek optimization to help increase transfer efficiency and reduce disk latency. An elevator algorithm is a conventional disk scheduling algorithm. Generally, a disk head progresses in a single direction (from the center of the disk to the edge, or vice versa) serving the closest seek request in that direction. When it runs out of requests in the direction it is currently moving, it switches to the opposite direction. The elevator algorithm usually gives more equitable service to all disk requests. For example, while the disk is satisfying requests on one cylinder, other disk requests for the same cylinder could arrive. If enough requests for the same cylinder are generated, the disk drive heads would remain at that cylinder forever, thus ignoring all other requests. This problem is avoided by limiting how long the disk drive heads will remain at any one cylinder, such as by only serving the requests for the cylinder that are already in a disk request queue when the disk drive heads reach the requested cylinder. New requests for that cylinder that arrive while existing requests are being served will thus have to wait for the next pass.

An operation queue is provided for maintaining disk requests, such as read or write requests. The requests in the queue may be ordered in any fashion. For example, the requests in the queue may be placed in their most physically adjacent order (determined from the data location on the disk at which the request is directed) so that the disk drive read/write head can process them with minimal movement. Thus, given a particular disk request, the disk may perform a sequence of <seek> <wait for rotation> <transfer data> <seek> <wait for rotation> <transfer data> ... operations. When the density of requests in the queue reaches a threshold, the seek delay of the disk becomes much smaller than the rotational delay of the disk since the likelihood of physically adjacent requests in the queue is enhanced, and transfer efficiency can be increased.

The present invention affords a system and method for organizing the data on a disk to enhance the transfer efficiency of the disk. In general, optimal data organization on the disk may occur when the data is organized such that the total rotational delay of the disk is less than one rotation of the disk, i.e., a transfer unit is selected to be less than one-half of a track. Accordingly, the disk can perform one transaction per rotation (120 to 180 per second in most modern "fast" disks) which is a substantially faster efficiency than most file systems can utilize. Therefore, the transfer unit size of the data thereby becomes important.

For example, assuming the unit of transfer is ½ track, there would be half of a disk rotation between the end of the data transfer and the earliest possible beginning of the next data transfer. For "fast" disks, this rotation time may be about 2.7 to 4.1 milliseconds. By moving the disk drive head to the next requested ½ track within the "open" rotation period (the half of a disk rotation), the next disk request may be serviced on the next rotation of the disk. Alternatively, if the disk drive head cannot be moved to the next requested ½ track within the "open" rotation period (the half of a disk rotation), by moving the disk drive head to the next requested ½ track within an additional full rotation period, the next disk request may be serviced. The net effect is that the overall service rate of the disk is increased dramatically once the density of disk requests reaches a predetermined threshold. For example, by providing ⅓ of a track as a data transfer block, at least an additional millisecond for seeking can be provided. Thus, the maximum seek rate of the disk can be increased.

Utilizing a fraction of a track for a data block transfer size offers a number of advantages over conventional systems. For example, regarding disk bandwidth efficiency, substantially half of the total disk bandwidth may be utilized for data transfer as opposed to less than one-fifth of the available disk bandwidth as occurs using conventional data transfer methods. This advantage results from the system being more seek efficient and thereby free to spend more time performing data transfer.

Additionally, metadata information may be simplified, and transfer unit size can be made variable (supporting variable track sizes on the disk). This advantage allows for disk geometries to be managed explicitly for maximum efficiency without adding additional file management complexity to the system. Finally, by providing variable sized transfer units, compression and its attendant space demand variances on the disk can be utilized by the system without incurring the problems inherent in conventional file systems. Thus, a fractional track file system offers significant advantages over existing block file systems.

To accomplish these advantages, in accordance with the invention, the data transfer unit is treated as a pool of space made up of a small quanta of storage, for example, 32 or 64 bytes. For the purposes of the invention, this transfer unit will be referred to herein as an "extent." Additionally, a unit of storage within an extent will be referred to herein as a "granule." Further, as used herein, a "component" refers to a sequence of granules. Components are analogous to traditional blocks of data, however, components do not have a fixed size nor do they have an absolute disk address.

In accordance with the invention, file components may be managed by the system with minimum information, i.e., an extent number, a file number and a file offset within that file. The extent number specifies which extent to fetch from the disk drive and the file number allows the file system to locate a particular component within the extent. The disk address allows the data in a file to be accessed in the proper order.

Figure 1:
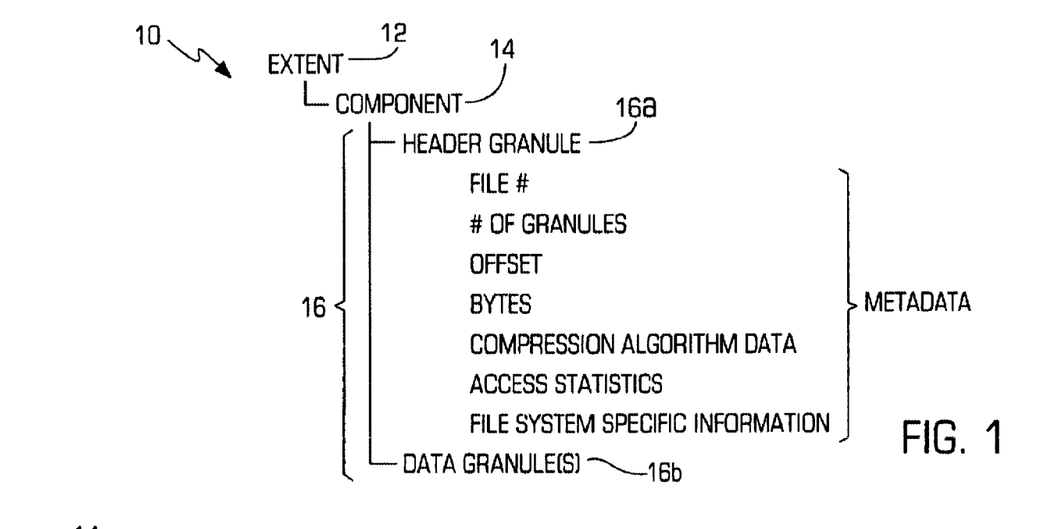
FIG. 1 illustrates a diagram of a file structure in accordance with the invention.

FIG. 1 illustrates a data structure 10 in accordance with the invention. As described above, the data-structure may comprise an extent 12. Within the extent 12, at least one component 14 may be provided. Each component 14 may include one or more granules 16 of storage.

Figure 2:
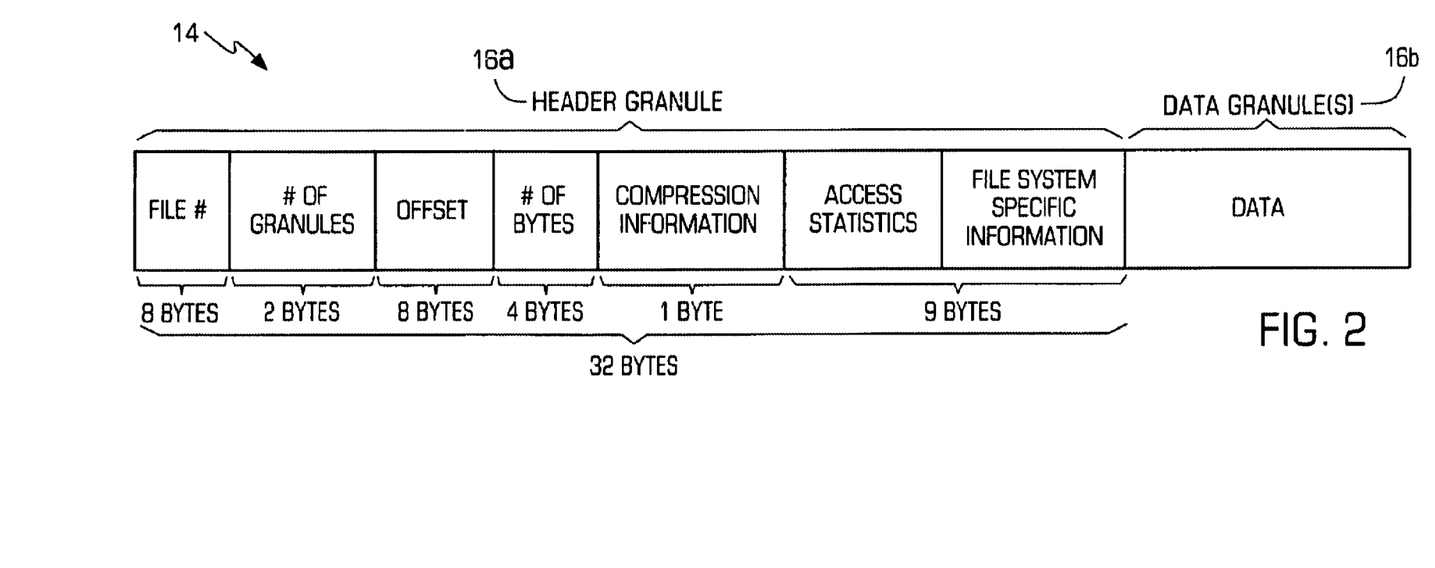
FIG. 2 shows a block diagram of a component of the file structure illustrated in FIG. 1.

A representation of a component 14 of the data structure 10 is shown in FIG. 2 with like elements represented by like reference numerals. As shown in FIG. 2, the first granule of a component 14 is a data structure (header 16a) which specifies any important information concerning the component 14, while the remaining granules are data granules 16b. The header 16a may specify a file number 17a to which the component 14 belongs. File number information may be specified, for example, as 8 bytes of information, however, additional bytes may be provided to specify the file number information. The header 16a may also specify the number of granules 17b in the component 14. For example, two bytes may be provided for specifying the number of granules in the component 14, however, additional bytes may be provided to specify the number of granules in the component 14 depending on the file system architecture.

The header 16a may also specify the offset 17c into a file for the component 14. That is, it may specify the location of the component 14 within a file. For example, the offset information may be provided as 8 bytes in the header 16a. Of course, the number of bytes provided to specify the offset of the component 14 in the file may be different depending on the file system architecture.

Additionally, the header 16a may specify the number of file bytes 17d represented by the component 14. The number of file bytes may be specified, for example, as 4 bytes in the header 16a, however, an additional or lesser number of bytes may be provided to specify the number of file bytes represented by the component 14 depending on the file system architecture.

Optionally, compression algorithm information 17e or other additional information concerning the component may be specified in the header 16a. For example, supposing the component 14 has been compressed according to a predetermined compression algorithm, at least one byte within the header 16a may represent an algorithm number of the compression algorithm utilized.

Additionally, access statistics 17f for specifying optimal placement of data on the disk may be specified within the header 16a. For example, depending on the read/write history of the data contained in the component 14, access statistics may be provided in the header 16a so that the system may optimally locate the component 14 appropriately on the disk. Of course, additional file system specific information 17g may also be provided in the header 14.

Preferably, a 32 byte ($2^5$ byte) granule 16 is provided as a header 16a for a particular component 14. However, components 14 can have additional header granules 16a to manage file-specific information such as security information, redundancy information, backup information, etc.

Figure 3:
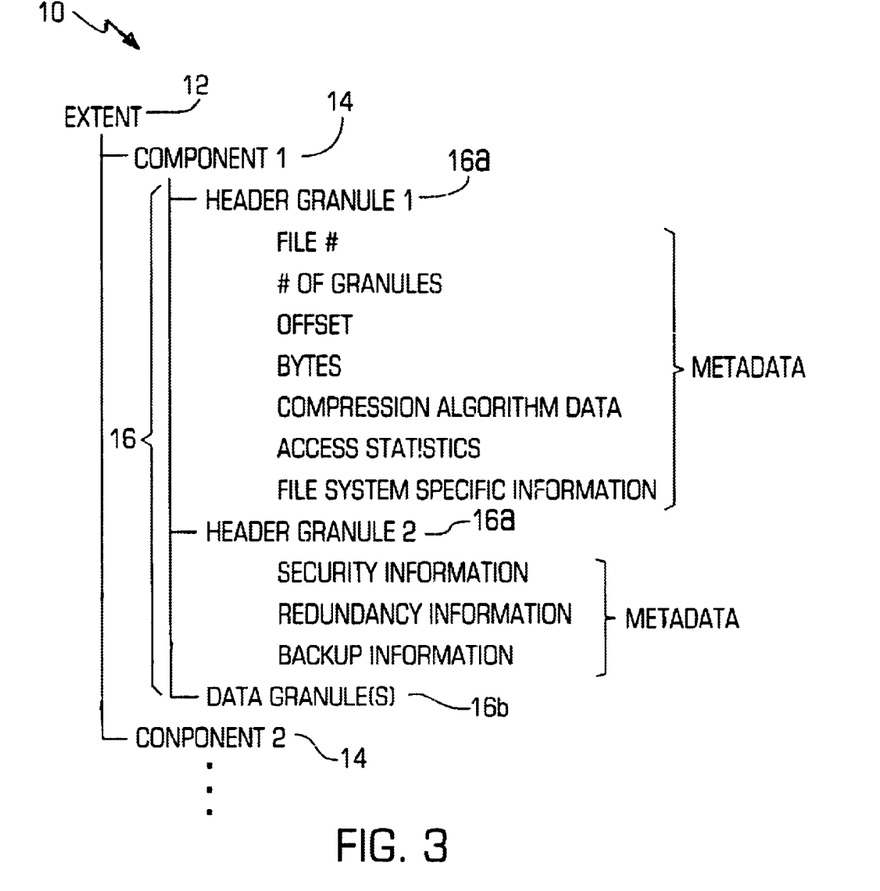
FIG. 3 illustrates a diagram of a second embodiment of a file structure in accordance with the invention.

FIG. 3 illustrates such an alternative embodiment in accordance with the invention, in which like elements are indicated by like reference numbers. Since an extent 12 can include many components 14 (as shown in FIG. 3) and can include more than one component 14 for a single file without any ambiguity, the header information 16a becomes important for the system to effectively and efficiently manage data on the disk.

By providing storage units as granules of space 16, free space management within an extent 12 is simplified. Since a granule of space 16 is either contained in a component 14 or is available for storage, free space management at the file system level is based simply upon tracking the number of free granules 16 per-extent 12. This approach allows for the utilization of large components 14 within an extent 12 which further enhances efficiency of the disk. For example, disk efficiency may be enhanced by optimally organizing the data on the disk. Optimal data organization generally occurs when the total seek delay is less than one rotation of the disk. This aspect allows the disk to perform one transaction per rotation (120 to 180 per second in most modern "fast" disks) which is substantially faster and more efficient than most conventional file systems.

By providing a variable transfer size of data, i.e., ½ of a disk track, disk efficiency can be enhanced since there would be half of a rotation between the end of the data transfer and the earliest possible start of the next data transfer. If the disk drive head can be moved to the next requested track in this time period (the half of a rotation), the next request may be serviced on the next disk rotation. If the disk drive head cannot be moved to the next requested track in this time period, it can almost always be moved in an additional full rotation of the disk (i.e., 3⁄2 of a rotation). The net effect is that the overall service rate of the disk can increase dramatically once leading passes a predetermined threshold.

Accordingly, in accordance with the invention, the conventional elevator algorithm may be modified so that requests for the first half of any track may be handled while seeking in one direction and the second half of the track while seeking in the other direction. The effect is to cause the disk to be kept near an optimal seek/transfer ratio. Of course, optimal disk efficiency may be enhanced by additional information which would allow the system to intersperse disk requests for different fractions of a track based upon likely seek distances and even additional information such as time in the queue and relative priority of a seek request.

The present invention also allows for the use of compression since compression ratios are improved. Since the extent 12 may be treated as a pool of space made up of a small quanta of storage (i.e., 32 or 64 bytes), a typical extent 12 may be in the 64 K to 128 K range for modern disks (this number could be larger depending on performance and capacity parameters of a disk, or disk array structure). Small file sizes result in improved compression ratios. Further, since different compression techniques can provide better compression rates based upon data patterns and compute tradeoffs, in accordance with the invention, it is possible to iteritively process a component 14 with different compression algorithms and thereby disregard the compression results if not superior to the current compression ratio, without additional complexity.

To maintain organizational optimization of the data on the disk, a "background" or "janitorial" task may be provided by the system. This task may reorganize files on the disk to make independent files contiguous and to improve extent 12 placement toward the middle of the disk (or other such disk geometry optimizations). Additionally, it may analyze usage information and apply a different compression algorithm for a component 14, as described above. This allows files to be originally stored uncompressed, but over time, as data is frequently moved around the disk, files may be compressed as they become dormant. This aspect alleviates CPU compression processing burden. Instead, compression processing can be performed during CPU idle time when additional CPU cycles are free to process compression algorithms.

Figure 4:
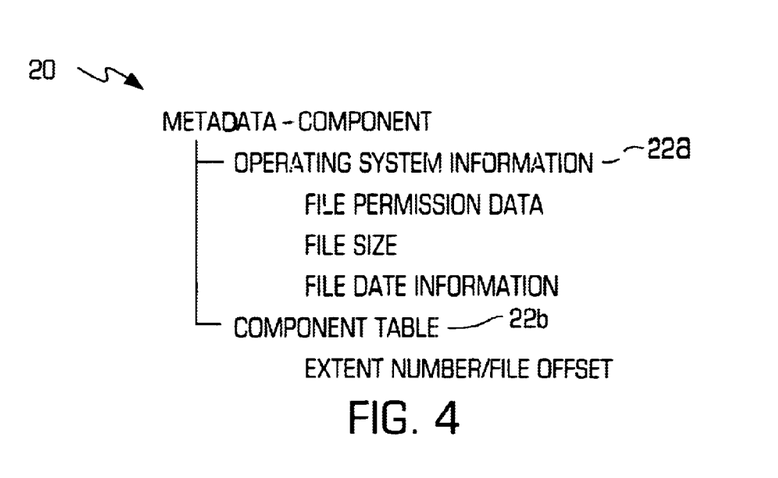
FIG. 4 illustrates a diagram of a metadata-component file structure in accordance with the invention.
Figure 5:
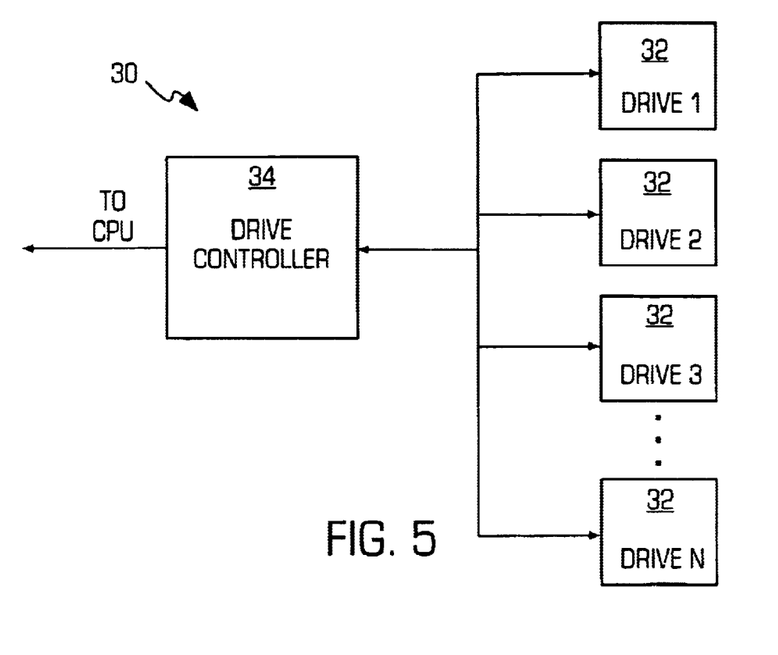
FIG. 5 shows a block diagram of an embodiment of a disk array system that can use the file system of the invention.

In accordance with the invention, file system metadata becomes relatively simple for the system to manage. By providing data storage units as granules 16, components are able to increase and decrease in size. Thus, metadata can grow or shrink accordingly. For example, a component 14 may be allocated for each file within the file system (this is similar to the UNIX I-node function). FIG. 4 illustrates a metadata-component 20 in accordance with the invention. The allocated metadata component 20 may contain at least two data structures 22a, 22b: (1) the permission, sizes, dates, etc., for the file which are needed by the operating system (reference number 22a) and (2) a table of components (extent number and file offset pairs) for the components 14 of the file (reference number 22b). Thus, depending on the number of components 14 within a file, the metadata complexity may change accordingly.

In accordance with the invention, disk cache performance may also be improved. Generally, the efficient use of disk space is important to providing an efficient disk cache. By organizing the disk cache around the granules 16, components 14 and extents 12, more "live" (predominantly accessed) data may be retained in memory than previously allowed by conventional file systems. Additionally, since the disk cache is organized around the granules 16, components 14 and extents 12, small data files will not waste large amounts of cache space with vacant data blocks.

On disk storage efficiency is also improved by the invention. Due to the smaller granule 16 size and the lack of large fixed data structures, such as the UNIX I-node tables and allocation bit maps, a 50% to 100% increase in effective storage capacity may be achieved, without compression. Further, by applying standard compression algorithms that provide a 2x increase in storage density, a three-fold increase in overall storage efficiency may be achieved by the invention.

Additionally, the invention may be used with multiple disks in an array of disks. FIG. 4 illustrates a conventional RAID (Redundant Array of Independent Disks) array 30. In a RAID array, multiple small inexpensive disk drives are combined into an array which yields performance exceeding that of one large and expensive drive. This array of drives appears to a computer as a single logical storage unit or drive.

A RAID array allows for information to be spread across several disks, using techniques such as disk striping (RAID Level 0) where data is segregated into different stripes which are stored on different disks, and disk mirroring (RAID level 1) where the same data is written to more than one disk, to achieve redundancy, lower latency and/or higher bandwidth for reading and/or writing to-disks. RAID arrays also maximize recoverability from hard-disk crashes. Data may be distributed across each drive in the array in a consistent manner. To accomplish this, the data is first organized into consistently-sized "chunks" (often 32 K or 64 K in size, although different sizes can be used). Each chunk is then written to each drive in the array in turn. When the data is to be read, the process is reversed, giving the illusion that multiple drives are actually one large drive.

A traditional RAID file system architecture 30 involves dedicating the storage of one disk 32 (or its equivalent) to hold parity information of the array 30, such that all the information in a stripe (the spreading out of data blocks of each file across multiple disks) is recoverable should one disk 32 in the array 30 fail (implemented in both RAID 4 and RAID 5 architectures). Alternatively, instead of dedicating a single drive 32 to hold the parity information, the information may be spread across all of the drives 32 in the array 30.

However, the conventional RAID architecture 30 suffers from significant disadvantages such as disk inefficiency that limits its usefulness. For example, expansion is made difficult, where all the parity information is spread over the existing drives 32 in the array 30. Adding another disk drive 32 to the array 30 requires reorganizing the data across all the drives 32 and moving the parity information around the array 30. Additionally, updating the RAID array 30 is also difficult. For example, changing a single sector on one disk 32 in the array 30 involves modifying the associated parity information as well. Ultimately, the limiting factor on small data write operations is the speed at which this parity information can be read, recomputed and then rewritten by the system. Thus, write operations on a RAID system 30 are traditionally slower than on regular disk drives.

In contrast to conventional RAID systems, in accordance with the invention a complete extent 12 may be written to the disk drive array 30. This aspect is illustrated in FIG. 4. Since the system does not utilize "short" updates (less than 1 extent), the parity information for the RAID disk array 30 can always be determined by the system so the conventional <read> <compute> <write> operation cycle is eliminated. Additionally, because extents 12 can be different sizes, additional disks 32 that may be added to a disk array 30 need not be identical in size or density. In fact, by remapping the zones of the disks 32 in the array 30, in accordance with the invention, differing disk geometries may be accomodated without adding complexity to the system.

Furthermore, in contrast with the conventional RAID architecture 30, with the invention the need for a parity disk 32 is eliminated. Instead, the redundant information about the system is managed at the file system level as opposed to being managed at the disk level. Therefore, if an extent 12 is spread over several disks 32 in an array 30, since the parity information is managed at the file system level, the largest amount of the extent 12 that may be lost should one disk 32 in the array 30 fail is known by the system at all times.

In accordance with the invention, a meta-component 20 (a component that is generated by the file system and may contain parity information relating to the entire extent, or at least a subset of components in the extent) may be utilized to manage parity information across the RAID array 30. Such meta-components 20 may be used in place of dedicating an entire disk (or equivalent) to managing parity information across the RAID array 30. Thus, by providing a "meta-component" 20 of the same size as the largest component that might be lost should a disk 32 in the array 30 fail as determined from the parity information within the extent 12, it is thus possible to provide full RAID recovery. Some extents 12 may include these meta-components 20 while others may not.

For example, a certain file on a disk 32 in the RAID array 30 may be marked (i.e., flagged) as "important." Important files may be stored redundantly in the array 30 so the likelihood of file corruption and file loss is minimized. Storing files redundantly in the array 30 causes the file system to include meta-components 20 in all extents 12 for those files. Other files on a disk 32 in the RAID array 30 may be marked (i.e., flagged) as "temporary." Temporary files may not be necessary or important files, and their loss in the event of a disk failure or other catastrophic system crash, may be inconsequential. Temporary files may be stored utilizing lower-overhead, non-redundant techniques across the array 30. Another example involves files on a disk 32 in the RAID array 30 marked (i.e., flagged) as "high performance files." High performance files may be those frequently utilized by the system. Thus, high performance files may be stored in several locations across the RAID array 30 facilitating efficient read access (the file system would utilize the nearest location when accessing the file). In accordance with the invention, meta-components 20 may be utilized to manage this parity information across the disk array 30.

Providing this meta-component information 20 within an extent 12 offers several advantages. For example, system resources are better utilized. Protection of data may be selected at the file level, as opposed to the file system level, which is done in conventional file systems. Secondly, the placement of components 14 within the system may be duplicated to improve access speed for data mirroring applications with the added benefit of additional reliability. Additionally, a parity region may be included in each extent 12 to provide full width RAID coverage for the extent 12 so that any portion of the extent 12 may be recovered should one of the disks 32 in the array 30 fail. For example, if an extent 12 is spread across several disks 32 in an array 30, then the loss of a particular disk 32 in the array 30 will result in the loss of a known portion of the extent 12. Thus, by maintaining at a known location in the extent 12, one or more redundant components related to the lost portion of the extent 12, the parity information may be used to recalculate the lost data.

Finally, a second "meta-component" 20 may be provided that utilizes an orthogonal parity scheme to recover from an additional failure that might occur on an ultra-wide disk array 30 (i.e. a large amount of disks 32 in the array 30). The second meta component 20 affords recovery from the failure of a second disk 32 in the array 30. This technique may be extended to support recovery from N disks 32 in an array 30.

In addition to reading disk data, modern disk drives also provide for the reading of error control check (ECC) information. In accordance with the invention, given a situation where two or more sectors in an extent 12 indicate data errors, the likelihood that the error sectors overlap is minimal. By providing redundant parity information within the extent 12, it is possible to recover some (or even all) of the corrupted data bits across the afflicted sectors. Even if the corrupted data in the afflicted sectors cannot be completely recovered by the system, the likelihood of reducing the error pattern to one which is recoverable by the disk drive's own ECC algorithms is enhanced significantly. Additionally, in accordance with the invention, because the relationship between disk sectors and associated ECC data creates a "finite field," assuming that an extent 12 is mapped across some number of disks with identical ECC structures, the parity of the sectors are also contained within this finite field. Therefore, the error recovery capability described above may also be extended across both the data and ECC sections of all the disks 32 in a disk array 30.

Figure 6:
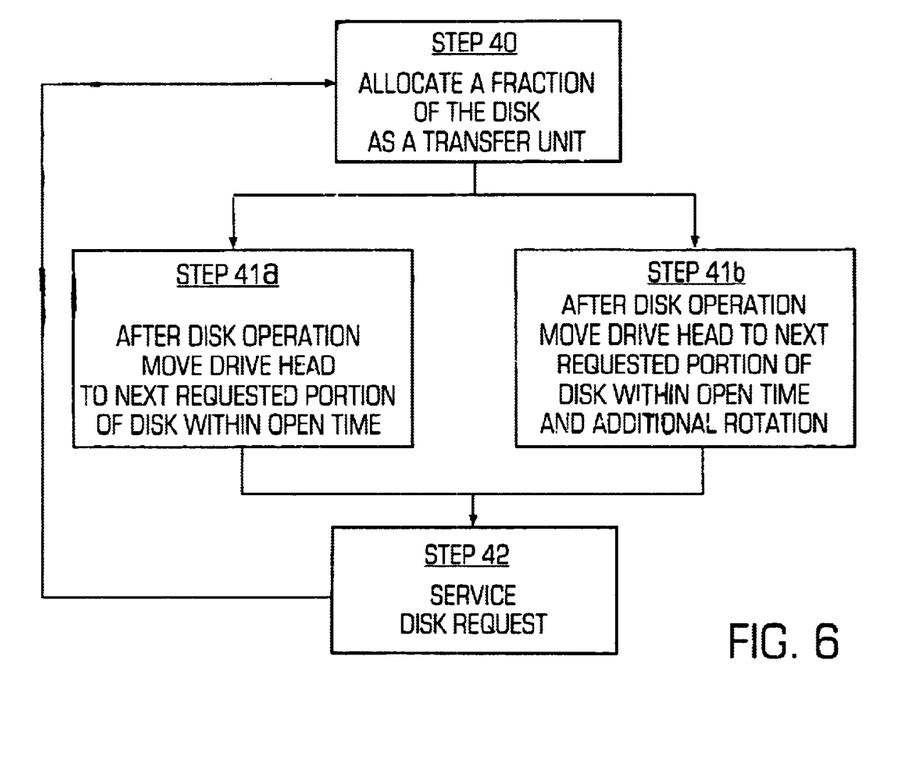
FIG. 6 is a flow chart illustrating a data transfer method in accordance with the invention for enhancing disk efficiency of the system.

FIG. 6 illustrates a method for enhancing the disk efficiency of the system. In accordance with the invention, a unit of data transfer on a disk is allocated as a fraction, such as ½ track, of the disk (Step 40). As such, there is half of a disk rotation between the end of the data transfer and the earliest possible beginning of the next data transfer. For "fast" disks, this rotation time may be about 2.7 to 4.1 milliseconds. After performing a read/write disk operation, the disk drive head is moved to the next requested ½ track within the "open" rotation period (the half of a disk rotation) (Step 41a) and the next disk request is serviced on the next rotation of the disk (Step 42).

Alternatively, if the disk drive head cannot be moved to the next requested ½ track within the "open" rotation period (the half of a disk rotation), the disk drive head is moved to the next requested ½ track within an additional full rotation period (Step 41b), and the next disk request is serviced (Step 42). The net effect is that the overall service rate of the disk is increased dramatically once the density of disk requests reaches a predetermined threshold since data access times are reduced from several disk rotations to, at most, one rotation. For example, by providing ⅓ of a track as a data transfer block, at least an additional millisecond for seeking can be provided. Providing different track fraction allocations as a data transfer block can result in a greater efficiency enhancement. Thus, the maximum seek rate of the disk can be increased depending on the allocated data transfer block size.

As described above, utilizing a fraction of a track for a data block transfer size offers a number of advantages over conventional systems. For example, substantially half of the total disk bandwidth may be utilized for data transfer as opposed to less than one-fifth of the available disk bandwidth as occurs using conventional data transfer methods, thereby substantially improving disk bandwidth efficiency. This advantage results from the system being more seek efficient and thereby free to spend more time performing data transfer.

Additionally, metadata information is simplified and transfer unit size can be made variable (supporting variable track sizes on the disk). This advantage allows for disk geometries to be managed explicitly for maximum efficiency without adding additional file management complexity to the system. Finally, by providing variable sized transfer units, the use of compression and its attendant space demand variances on the disk can be utilized by the system without incurring the problems inherent in conventional file systems.

While the foregoing has been described with reference to particular embodiments of the invention, such as a file system for optimally organizing on-disk data, it will be appreciated by those skilled in the art that changes in these embodiments may be made without departing from the principles and spirit of the invention. For example, while the system has been described in the context of disk drives, it is apparent by those skilled in the art that any type of storage system may be utilized without departing from the invention and that the above-described embodiment is merely illustrative of one embodiment of the invention.

What is claimed is:

1. A file system for organizing data on a disk drive to enhance data transfer efficiency by enabling transfer of a unit of data within a single revolution of the disk, the file system including a hierarchical data structure comprising:
   a plurality of data files organized on a data portion of the disk drive such that the servicing of each request to retrieve a particular data file from the disk drive can be completed during a single rotation of the disk, the data files including
      a granule storage unit for storing individual bits of data;
      a variable sized component data unit for grouping a sequence of granules as a related data unit; and
      an extent transfer unit including at least one variable sized component data unit as one of the data files; and wherein the file system further comprises
      metadata relating to the data files stored on a file management portion of the disk drive, the metadata including
         a first data structure for indicating operating system data relating to each of the data files; and
         a second data structure for maintaining a component table relating to the components included in each of the data files.

2. The file system of claim 1, wherein the data files are periodically reorganized on the data portion of the disk drive to maintain the enhanced data transfer efficiency of the disk drive.

3. The file system of claim 1, wherein the granule storage unit includes a header granule and at least one data granule.

4. The file system of claim 3, wherein the header granule includes metadata information relating to the at least one variable sized component data unit.

5. The file system of claim 4, wherein the metadata information includes one or more of a file number to which the at least one variable sized component data unit belongs, the number of granules within the at least one variable sized component data unit, component offset information in the file corresponding to the file number, the number of file bytes represented by the at least one variable sized component data unit, compression algorithm information, access statistics for specifying placement of the at least one variable sized component data unit on a disk, and additional file system specific information.

6. The file system of claim 4, wherein the header granule includes 32 bytes of metadata.

7. The file system of claim 3, wherein the granule storage unit includes a second header granule.

8. The file system of claim 7, wherein the second header granule includes supplemental metadata information relating to the at least one variable sized component data unit.

9. The file system of claim 8, wherein the supplemental metadata information includes any of security information, redundancy information and backup information.

10. A system for maintaining metadata information about data stored on a disk, comprising:
    a plurality of data files stored on the disk, each data file including a hierarchical data structure for storing a portion of data, the data structure including
       a granule storage unit configured to store individual bits of data;
       a randomly sized component data unit configured to group a sequence of granules as a related data unit; and
       an extent transfer unit configured to include at least one component data unit as a data file; and
    a plurality of meta-component data units, a respective meta-component data unit allocated for each data file, each meta-component data unit including
       a first data structure for maintaining operating system file information; and
       a second data structure for maintaining a component data table.

11. The system of claim 10, wherein the operating system file information includes any of data file permission information, data file size information, any data file data information.

12. The system of claim 10, wherein the component data table includes an extent number and file offset information pair for each of the component data units within the data file.

13. A method for organizing hierarchical data structures into a file system for a disk drive, comprising the steps of:
    defining an extent transfer unit comprising a number of bytes of data;
    assigning each extent transfer unit within the file system an extent number so that a particular extent can be located by the file system;
    assigning each component data unit within the extent a file number identifying the location of the component within the extent so that a particular component can be located by the file system;
    allocating a disk address to each component within the extent so that the data in the extent can be accessed in order;
    storing each component within the extent at the allocated disk address; and
    periodically relocating each component within the extent to a different location of the disk enabling transfer of a unit of data within a single revolution of the disk.

14. The method of claim 13, wherein frequently accessed components are relocated toward an inner portion of the disk drive.

15. The method of claim 13, wherein components are stored on the disk drive in an uncompressed format, and wherein components are compressed in accordance with a specific compression ratio as they become dormant.

16. The method of claim 15, further comprising comparing a plurality of compression ratios corresponding to a plurality of compression processes with the specific compression ratio and selecting the compression process that affords a higher compression ratio.

17. The method of claim 16, further comprising compressing the data using different compression processes during CPU idle time.

18. A file system for organizing files for storage on an array of independent disks configured to store a plurality of data files thereon, comprising:
    a plurality of data files organized on a data portion of a disk in the disk drive array enabling the transfer of a unit of data within a single revolution of the disk in the array, each data file including a hierarchical data structure, including
       a granule storage unit for storing individual bits of data;
       a variable sized component data unit for grouping a sequence of granules as a related data unit; and an extent transfer unit including at least one component data unit as a data file; and a plurality of meta-component data units stored on the disk array, a respective meta-component data unit allocated for each data file, each meta-component data unit including a first data structure for maintaining operating system file information; and a second data structure for maintaining a component data table relating to the components in the data files.

19. The file system of claim 18, wherein the plurality of data files are stored on the disk array such that at least a portion of some of the data files are stored on multiple disks in the array.

20. The file system of claim 18, wherein a parity region is provided in the extent transfer unit for maintaining parity information about the data file so that the data file can be maintained across the entire disk array such that complete data recovery can be accomplished in the event of a failure of one of the disks in the array in accordance with the parity information.

21. A file system for organizing files for storage on an ultra-wide array of independent disks, comprising:

a plurality of data files organized on a data portion of a disk in the ultra-wide array of independent disks enabling transfer of a unit of data within a single revolution of a disk in the array, each data file including a hierarchical data structure including a granule storage unit for storing individual bits of data;

a variable sized component data unit for grouping a sequence of granules as a related data unit; and an extent transfer unit including at least one variable sized component data unit as a data file;

a plurality of meta-component data units stored on the ultra-wide disk array, a respective meta-component data unit allocated for each data file for maintaining parity information about each of the associated data files such that a lost data file can be recovered in the event of a failure of a disk in the array, each meta-component data unit including a first data structure for maintaining operating system file information; and a second data structure for maintaining a component data table; and a second plurality of meta-component data units stored on the ultra-wide disk array, a respective second meta-component data unit allocated for each data file for maintaining secondary parity information about each of the associated data files, the secondary parity information including an orthogonal parity scheme such that a lost data file can be recovered in the event of a secondary failure of another disk in the array.

22. A method for enhancing the data transfer efficiency of a disk having a plurality of data tracks, comprising the steps of:

assigning a predetermined fraction of a data track of the disk as a data transfer unit;

in response to a disk operation to read or write data from an indicated data track of the disk, moving a data transfer read/write head of the disk to the indicated data track and carrying out the disk operation accordingly, such that the disk operation is completed after a fraction of a single rotation of the disk substantially equal to the data transfer unit;

determining a next disk operation to be performed at a next indicated data track of the disk;

within the remaining fraction of the single rotation of the disk, moving the data transfer read/write head to the next indicated data track of the disk; and carrying out the next disk operation to read or write data from the next indicated data track such that at least one disk operation is performed per a single rotation of the disk.

23. The method of claim 22, wherein the fraction of a data track assigned as the data transfer unit is ½ of the data track.

24. The method of claim 22, wherein the fraction of a data track assigned as the data transfer unit is ⅓ of the data track.

25. A method for enhancing the data transfer efficiency of a disk having a plurality of data tracks, comprising the steps of:

assigning a predetermined fraction of a data track of the disk as a data transfer unit, in response to a disk operation to read or write data from an indicated data track of the disk, moving a data transfer read/write head of the disk to the indicated data track and carrying out the disk operation accordingly, such that the disk operation is completed after a fraction of a single rotation of the disk substantially equal to the data transfer unit;

determining a next disk operation to be performed at a next indicated data track of the disk;

within the remaining fraction of the single rotation of the disk and a second complete rotation of the disk, moving the data transfer read/write head to the next indicated data track of the disk; and carrying out the next disk operation to read or write data from the next indicated data track such that at least one disk operation is performed per a single rotation of the disk.

26. The method of claim 25, wherein the fraction of a data track assigned as the data transfer unit is ½ of the data track.

27. The method of claim 25, wherein the fraction of a data track assigned as the data transfer unit is ⅓ of the data track.

* * * * *